United States Patent
Kim et al.

(10) Patent No.: US 10,164,499 B2
(45) Date of Patent: Dec. 25, 2018

(54) VOICE COIL MOTOR

(71) Applicant: LG INNOTEK CO., LTD., Seoul (KR)

(72) Inventors: Seung Ki Kim, Seoul (KR); Sang Ok Park, Seoul (KR); Seong Min Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 152 days.

(21) Appl. No.: 15/230,856

(22) Filed: Aug. 8, 2016

(65) Prior Publication Data

US 2016/0344252 A1 Nov. 24, 2016

Related U.S. Application Data

(63) Continuation of application No. 14/354,053, filed as application No. PCT/KR2012/008734 on Oct. 24, 2012, now Pat. No. 9,438,093.

(30) Foreign Application Priority Data

Oct. 24, 2011 (KR) .......................... 10-2011-0108600

(51) Int. Cl.
*G02B 7/02* (2006.01)
*H02K 5/10* (2006.01)
(Continued)

(52) U.S. Cl.
CPC .............. *H02K 5/10* (2013.01); *G02B 7/022* (2013.01); *G02B 7/04* (2013.01); *G02B 27/0006* (2013.01);
(Continued)

(58) Field of Classification Search
CPC ...... G02B 7/04; G02B 13/009; H02K 41/035; H02K 41/0356; H02K 5/10
See application file for complete search history.

(56) References Cited

U.S. PATENT DOCUMENTS

| 2007/0133110 A1 | 6/2007 | Huang |
| 2008/0231975 A1 | 9/2008 | Hou et al. |
| 2011/0170204 A1 | 7/2011 | Park et al. |

FOREIGN PATENT DOCUMENTS

| CN | 102075056 A | 5/2011 |
| KR | 10-2010-0022692 A | 3/2010 |

(Continued)

OTHER PUBLICATIONS

Office Action dated Jan. 2, 2018 in Korean Application No. 10-2011-0108600.

(Continued)

*Primary Examiner* — Joseph P Martinez
(74) *Attorney, Agent, or Firm* — Saliwanchik, Lloyd & Eisenschenk

(57) ABSTRACT

A voice coil motor (VCM) is disclosed, the VCM including: a rotor including a bobbin accommodated by a lens, and a coil block arranged at a periphery of the bobbin, a base formed with an opening for exposing a lens and a first foreign object penetration prevention unit formed along an upper edge, a stator including magnets wrapping the coil block and a housing formed with an opening for fixing the magnets and formed at a bottom surface with lateral surfaces formed with a second foreign object penetration prevention unit coupled to the first foreign object prevention unit, and an elastic member coupled to the bobbin to elastically support the bobbin.

18 Claims, 4 Drawing Sheets

(51) Int. Cl.
*H02K 41/035* (2006.01)
*G02B 7/04* (2006.01)
*G02B 27/00* (2006.01)
*G03B 13/34* (2006.01)

(52) U.S. Cl.
CPC .......... *G03B 13/34* (2013.01); *H02K 41/035* (2013.01); *H02K 41/0356* (2013.01)

(56) References Cited

FOREIGN PATENT DOCUMENTS

| KR | 10-2010-0106011 | * | 10/2010 | ............... G02B 7/04 |
| KR | 10-2010-0106013 | A | 10/2010 | |
| KR | 1020100106011 | A | 10/2010 | |
| KR | 1020110005668 | A | 1/2011 | |
| KR | 10-2011-0055969 | A | 5/2011 | |
| KR | 1020110058582 | A | 6/2011 | |
| KR | 2020110008478 | U | 8/2011 | |
| KR | 10-2011-0111624 | * | 10/2011 | ............... G02B 7/07 |
| KR | 1020110111624 | A | 10/2011 | |

OTHER PUBLICATIONS

International Search Report in International Application No. PCT/KR2012/008734, filed Oct. 24, 2012.
Office Action dated Dec. 25, 2015 in Chinese Application No. 201280052203.4.
Extended European Search Report dated Nov. 16, 2016 in European Application No. 12843912.2.
European Search Report dated Jul. 5, 2018 in European Application No. 18165923.6.

* cited by examiner

VOICE COIL MOTOR

CROSS-REFERENCE TO RELATED APPLICATIONS

This application is a continuation of U.S. application Ser. No. 14/354,053, filed Apr. 24, 2014, which is the U.S. national stage application of International Patent Application No. PCT/KR2012/008734, filed Oct. 24, 2012, which claims priority to Korean Application No. 10-2011-0108600, filed Oct. 24, 2011, the disclosures of each of which are incorporated herein by reference in their entirety.

TECHNICAL FIELD

The present invention relates to a voice coil motor, and more particularly to a voice coil motor configured to prevent penetration of foreign objects.

BACKGROUND ART

Recently, mobile communication devices and small personal computers are mounted with a camera module capable of generating a digital image or a digital video corresponding to an outside light. A camera module includes an image sensor module changing an outside light to an image and a lens focusing the outside light to the image sensor module. A conventional camera module is disadvantageously fixed by the lens and the image sensor module, and a distance between the lens and the image sensor module cannot be adjusted to make it difficult to obtain a high quality image desired by a user.

Recently, a distance between the lens of a camera module and the image sensor can be adjusted by a VCM (Voice Coil Motor) to obtain a very high quality image from the camera module. A conventional VCM is configured in such a manner that an image sensor module is arranged at a rear surface, or a rear side of a base, and an IR (Infrared) filter is arranged at the rear surface of the base.

However, the IR filter recently suffers from a disadvantage in that, concomitant with increased resolution of an image sensor module, quality of an image or a video generated by the image sensor module greatly deteriorates in a case a foreign object such as dust is penetrated into the IR filter.

DISCLOSURE

Technical Problem

The present invention is directed to provide a VCM (Voice Coil Motor) configured to greatly enhance a quality of an image or a video generated from an image sensor module by preventing penetration of a foreign object introduced into an IR filter.

Technical Solution

In order to achieve at least the above objects, in whole or in part, and in accordance with the purpose of the disclosure, as embodied and broadly described, there is provided a VCM (Voice Coil Motor), in one general aspect of the present invention, the motor comprising: a rotor including a bobbin accommodated by a lens, and a coil block arranged at a periphery of the bobbin; a base formed with an opening for exposing a lens and a first foreign object penetration prevention unit formed along an upper edge; a stator including magnets wrapping the coil block and a housing formed with an opening for fixing the magnets and formed at a bottom surface with lateral surfaces formed with a second foreign object penetration prevention unit coupled to the first foreign object prevention unit; and an elastic member coupled to the bobbin to elastically support the bobbin.

In another general aspect of the present invention, there is provided a VCM (Voice Coil Motor), the VCM comprising: a rotor including a bobbin accommodated by a lens, and a coil block arranged at a periphery of the bobbin; a stator including magnets wrapping the coil block and a housing formed with an opening fixing the magnets and formed at a bottom surface with lateral surfaces formed with a first jaw preventing penetration of a foreign object; an elastic member coupled to the bobbin to elastically support the bobbin; and a base formed with lateral walls having an opening for exposing the lens and formed with a second jaw meshed with the first jaw formed at the lateral surfaces of the housing.

In still another general aspect of the present invention, there is provided a VCM (Voice Coil Motor), the VCM comprising: a rotor including a bobbin accommodated by a lens, and a coil block arranged at a periphery of the bobbin; a base formed with an opening for exposing a lens and a first foreign object prevention unit formed in a shape of a concave groove along an upper edge; a stator including magnets wrapping the coil block and a housing formed with an opening for fixing the magnets and formed at a bottom surface with lateral surfaces protrusively formed with a second foreign object penetration prevention unit coupled to the first foreign object penetration prevention unit; and an elastic member coupled to the bobbin to elastically support the bobbin.

Technical problems to be solved by the present invention are not restricted to the above-mentioned description, and any other technical problems not mentioned so far will be clearly appreciated from the following description by skill in the art.

Advantageous Effects

The voice coil motor according to the present invention has an advantageous effect in that a first foreign object penetration prevention unit is formed at a base, and a second foreign object penetration prevention unit coupled to the first foreign object penetration prevention unit is formed at a distal end of a housing formed with magnets contacting a base, to prevent penetration of foreign objects into an opening of the base by passing through the base and the housing, whereby a quality deterioration of an image or of a video generated from an image sensor module can be prevented.

BRIEF DESCRIPTION OF DRAWINGS

Non-limiting exemplary embodiments of the present invention will be described in detail with reference to the accompanying drawings. Like reference numerals refer to like parts or portions throughout the description of several views of the drawings.

DETAILED DESCRIPTION

The advantages, features and methods for achieving the foregoing will be apparent from the accompanying drawings and exemplary embodiments that follow. Embodiments of the present invention are described below by way of example only. These examples represent the best ways of putting the invention into practice that are currently known to the Applicant although they are not the only ways in which this could be achieved.

Now, the present invention will be described in detail with reference to the accompanying drawings.

Figure 1:
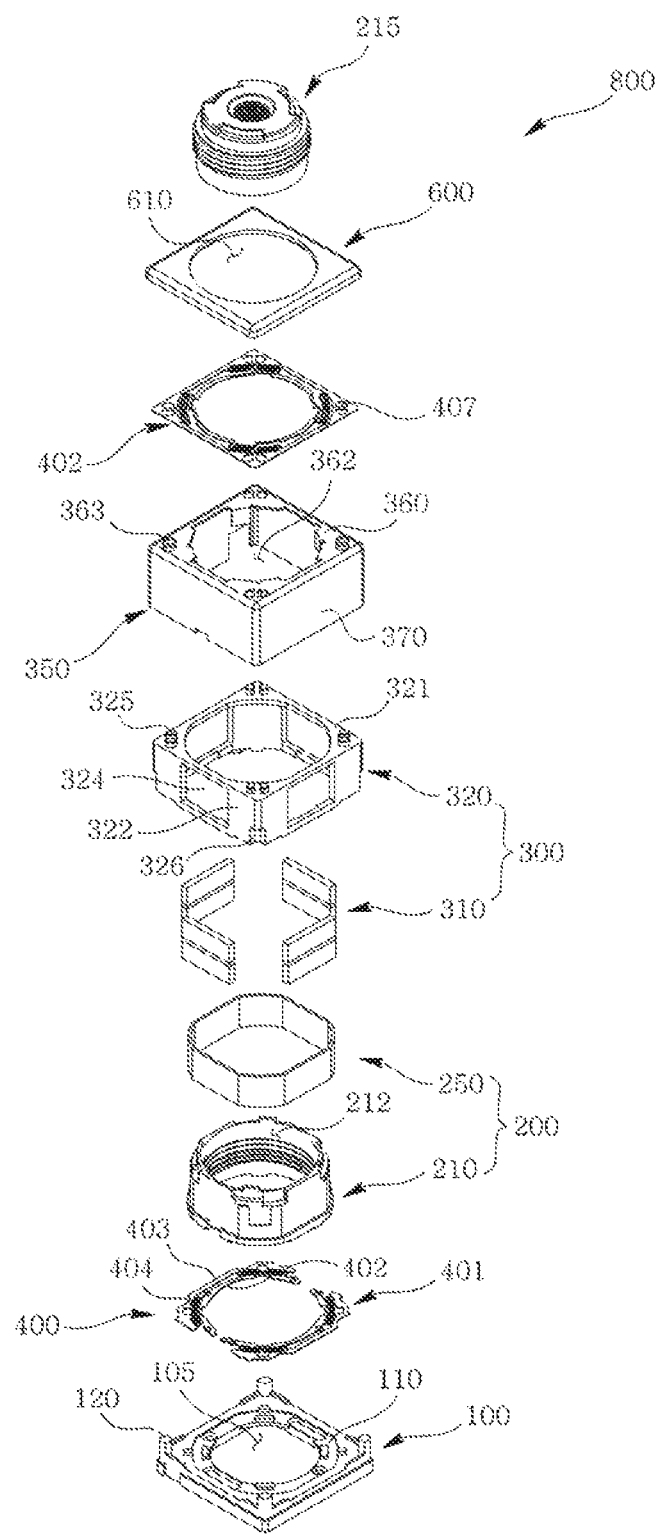
FIG. 1 is an exploded perspective view illustrating a voice coil motor according to an exemplary embodiment of the present invention.
Figure 2:
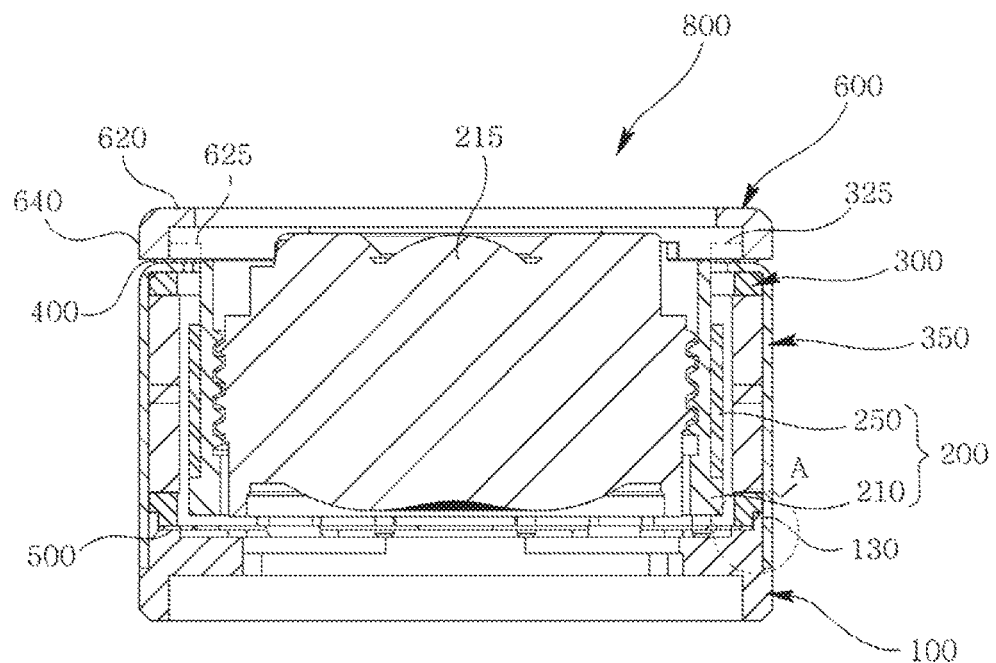
FIG. 2 is an assembled cross-sectional view of FIG. 1.
Figure 3:
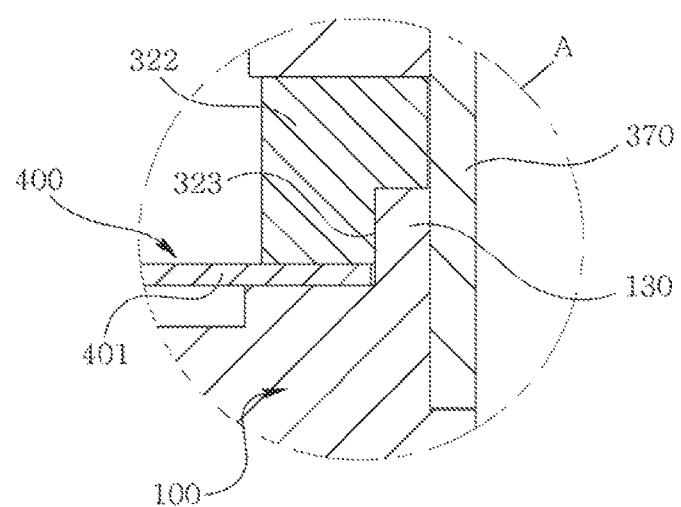
FIG. 3 is an enlarged view of 'A' of FIG. 2.
Figure 4:
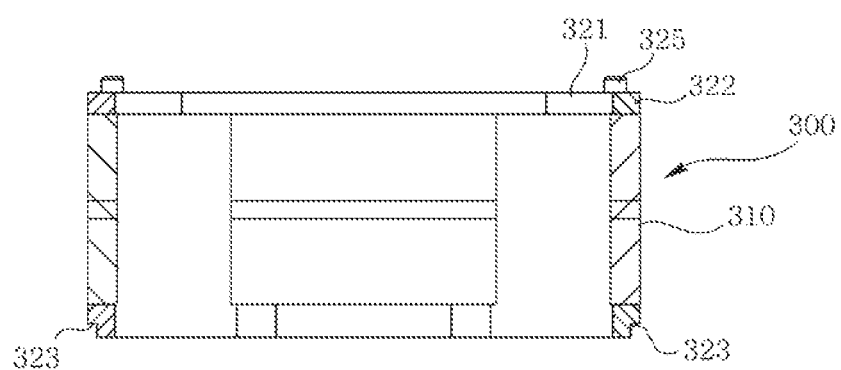
FIG. 4 is a longitudinal cross-sectional view of a housing in FIG. 1.

FIG. 1 is an exploded perspective view illustrating a voice coil motor according to an exemplary embodiment of the present invention, FIG. 2 is an assembled cross-sectional view of FIG. 1, FIG. 3 is an enlarged view of 'A' of FIG. 2, and FIG. 4 is a longitudinal cross-sectional view of a housing in FIG. 1.

Referring to FIG. 1, a VCM (800, Voice Coil Motor) includes a rotor (200), a stator (300), an elastic member (400) and abase (100). In addition, the VCM (800) may further include a yoke (350) and a cover member (600). The base (100) serves to fix the rotor (200, described later), the stator, the elastic member (400) and the yoke (350). The base is formed with a form similar to a rectangular parallelepiped plate centrally formed with an opening (105), for example. The base (100) is formed at a rear surface with an IR (Infrared) filter and/or an image sensor module (not shown). The image sensor module generates a digital image or a digital video correponding to an outside light incident through the opening (105) of the base (100). Four corners of an upper surface (110) of the base (100) are formed with four coupling pillars (120) protruded to a direction perpendicular to the upper surface (110) of the base (100).

Now, referring to FIGS. 2 and 3, the upper surface (110) of the base (100) is formed with first foreign object penetration prevention units (130) which in turn protrude, each in the shape of a wall, along an edge of the upper surface (110) of the base (100). The first foreign object penetration prevention units (130) may be formed in the shape of connecting four coupling pillars (120), and each of the first foreign object penetration prevention units (130) may take a form of a square closed loop when viewed in a top plan view.

The first foreign object penetration prevention units (130) formed on the upper surface (110) of the base (100) are coupled to a housing of a stator (described later) to prevent foreign objects from penetrating an opening formed at the base (100). Each of the first foreign object penetration prevention units (130) formed on the upper surface (110) of the base (100) in an exemplary embodiment of the present invention may be formed with a first thickness, for example.

Referring to FIG. 1 again, the rotor (200) includes a bobbin (210) and a coil block (250). The bobbin (210) is formed in a shape of a cylinder having a through hole (212), for example, and the bobbin (210) is coupled at an inner surface thereof to a lens (215). In an exemplary embodiment of the present invention, an inner circumferential surface of the bobbin (210) and an outer circumferential surface of the lens (215) may be fixed by way of a screw fastening method. For example, the inner circumferential surface of the bobbin (210) may be formed with a female screw unit, and the outer circumferential surface of the lens (215) may be formed with a male screw unit.

The coil block (250) takes a shape of a cylinder, for example, and is formed by winding a long wire coated with an insulation resin in a shape of a cylinder. The cylindrical coil block (250) may be inserted into an outer circumferential surface of the bobbin (210), and the coil block (250) arranged at the outer circumferential surface of the bobbin (210) is attached to the outer circumferential surface of the bobbin (210) using an adhesive. Alternatively, the coil block (250) may be directly wound on the outer circumferential surface of the bobbin (210).

Both distal ends of the coil block (250) formed on the outer circumferential surface (external surface) of the bobbin (210) protrude downwards of the bobbin (210), and both distal ends of the coil block (250) protruding downwards of the bobbin (210) are electrically connected to the elastic member (400, described later).

The stator (300) includes a magnet (310) and a housing (320). The magnet (310) is arranged opposite to the coil block (250) wound on the bobbin (210), where a plurality of magnets (310) is provided. The magnets (310) in an exemplary embodiment of the present invention includes flat magnets formed in a plate, and four magnets (310) each being formed in a perpendicular method, may be arranged opposite to the coil block (250), for example. The housing (320) serves to fix each of the magnets at a designated position. The housing (320) is formed in a shape of a rectangular parallelepiped opened at an upper surface and at a bottom surface. The housing (320) is formed at an upper surface (321) with an opening for exposing the bobbin (210) of the rotor (200). Furthermore, the housing (320) is formed at the upper surface (321) with coupling bosses (325) for fixing the elastic member (400, described later).

The coupling bosses (325) are formed on four corners of the upper surface (321) opened in the shape of a square plate, and the coupling bosses formed at each corner are formed in a pair. Furthermore, each lateral surface (322) of the housing (320) arranged in parallel with the outer circumferential surface of the bobbin (210) and connected to the upper surface (321) is formed with a magnet accommocation hole (324) for securing the magnet (310). The magnet accommocation hole 324) may be an opening formed at each lateral surface (322) of the housing (320).

The corner of the lateral surface (322) of the housing (320) is formed with coupling grooves (326) coupled to each coupling pillar (120) protruded from the upper surface (110) of the base (100), where the coupling pillars (120) of the base (100) and the coupling grooves (326) are coupled by being meshed together (press-fitted). Each lateral surface (322) of the housing (320) in an exemplary embodiment of the present invention is formed with a thickness thicker than a thickness of a first thickness of the first foreign object penetration prevention unit (130) protruded in a square closed loop from the upper surface (110) of the base (100).

Referring to FIGS. 2 and 3, each lateral surface (322) of the housing (320) is formed with a second foreign object penetration prevention unit (323) for preventing penetration of foreign objects into the IR filter arranged at the rear surface of the base. The second foreign object penetration prevention unit (323) may be a groove formed in a jaw at a bottom surface of each lateral surface (322) of the housing (320), for example. The second foreign object penetration prevention unit (323) is formed in a shape of being meshed with the first foreign object penetration prevention unit (130) formed on the upper surface (110) of the base (100).

In order to prevent penetration of foreign objects into a gap formed between the first and second foreign object penetration prevention unit (130, 323), a foreign object penetration prevention member may be interposed between the first and second foreign object penetration prevention unit (130, 323).

The foreign object penetration prevention member in an exemplary embodiment of the present invention may include an epoxy resin having a viscosity, for example. Alternatively, the foreign object penetration prevention member may be an adhesive interposed between the first and second foreign object penetration prevention unit (130, 323).

For example, the second foreign object penetration prevention unit (323) and the first foreign object penetration prevention unit (130) formed on the upper surface (110) of the base (100) may be coupled by a half-lap joint method as shown in FIG. 3.

A length of moving path required by foreign object to reach the opening (105) of the base (100) can be increased to thereby prevent the foreign object from being arranged on the IR filter through the opening (105) by way of the second foreign object penetration prevention unit (323) and the foreign object penetration prevention unit (130) formed on the upper surface (110) of the base (100) being meshed through the half-lap joint method.

The external surface of each lateral surface (322) at the housing (320) and an external surface of the first foreign object penetration prevention unit (130) at the base (100) are arranged on a same planar surface, while the second foreign object penetration prevention unit (323) formed at the bottom surface of each lateral surface (3220 of the housing (320) and the first foreign object penetration prevention unit (130) formed on the upper surface (110) of the base (100) are meshed in an exemplary embodiment of the present invention. Furthermore, the bottom surface of the housing (320) and the upper surface (110) of the base (100) are arranged on a same planar surface.

The yoke (350) includes an upper plate (360) and a lateral plate (370). The yoke (350) serves to prevent leakage of magnetic field of the magnet (310) coupled to the housing (320) by covering the housing (320). The yoke (350) may be formed by press-woring a metal plate. The upper plate (360) of the yoke (350) is formed in a shape of a plate formed in parallel with the upper surface (321) of the housing (320), and the upper surface (360) is formed with an opening (362) for exposing the lens (215) coupled to the bobbin (212).

The upper plate (360) of the yoke (350) is formed with a through hole (363) through which each of the coupling bosses (325) formed on the upper surface (321) of the housing (320), where the coupling boss (325) passes the through hole (363) formed at the upper surface (360) of the yoke (350) to protrude from the upper surface (360) of the yoke (350) at a predetermined height.

The lateral plate (370) of the yoke (350) is extended to a direction parallel with the lateral surface (322) of the housing (320) from an edge of the upper plate (360) of the yoke (350), and coupled to a jaw formed at a lateral surface of the base (100).

The lateral plate (370) of the yoke (350) in an exemplary embodiment of the present invention covers a border between the first foreign object penetration prevention unit (130) of the base (100) meshed with the second foreign object penetration prevention unit (323) of the housing (320) to prevent again the penetration of foreign object introduced to the IR filter through the opening (105) of the base (100).

The elastic member (400) includes a first elastic member (401) and a second elastic member (402). The first elastic member (401) is formed in a pair, each spaced apart at a predetermined distance. Each of the first elastic members (401) includes an inner elastic member (402), an outer elastic member (403) and a connection elastic member (404). The first elastic member (401) functions to elastically support the bottom surface of the bobbin (210), and each of the pair of first elastic members (401) is electrically connected to both distal ends of the coil block (250). That is, the coil block (250) receives a driving signal such as a current using the first elastic member (401) as a medium. Each of the outer elastic members (403) at the first elastic member (401) is fixedly interposed between a distal end of the lateral surface (322) of the housing (320) and the upper surface (110) of the base (100).

The second elastic member (402) is arranged on an upper surface of the yoke (350), and secured to an upper end of the bobbin (210). The second elastic member (402) is formed with a coupling hole (407) formed on the upper surface (321) of the housing (320) to allow each of the coupling bosses (325) having penetrated the through hole (363) of the upper surface (360) at the yoke (350) to pass therethrough.

The cover member (600) is formed in a shape of a plate formed with an opening (610), and an upper plate (620) forming the cover member (600) is formed with a coupling groove (625) coupled to the coupling boss (325) of the housing (320) having penetrated the upper plate (360) of the yoke (350) and the elastic member (400). The coupling groove (625) in an exemplary embodiment of the present invention may be meshed (press-fitted) with the coupling boss (325), and preferably, the coupling groove (625) may be formed with an adhesive attaching the coupling boss (325) and the cover member (600).

An edge of the upper plate (620) of the cover member (600) is formed with a lateral plate (640) contacting the elastic member (400), and the lateral plate (640) of the elastic member (400) serves to prevent the elastic member (400) and the upper plate (620) of the cover member (600) from being interfered by mutual contact.

Although the exemplary embodiments of the present invention have explained and illustrated the coupling boss (325) of the housing (320) being coupled to the coupling groove (625) formed at the upper plate (620) of the cover member (600), the present invention is not limited thereto. For example, it may be possible to form a through hole corresponding to the coupling boss (325) of the cover member (600) at the upper plate (620) of the cover member (600), and the coupling boss (325) is coupled using the through hole of the upper plate (620). Furthermore, it may be possible to fuse the coupling boss (325) to the upper plate (620) while forming a through hole at the upper plate (620) to allow the coupling boss (325) to pass the upper plate (620).

Mode for Invention

Figure 5:
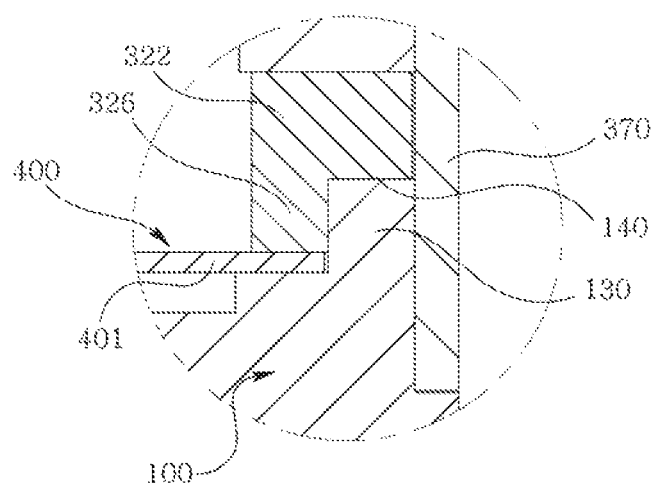
FIG. 5 is a cross-sectional view illustrating a coupled structure between a housing and a base according to another exemplary embodiment of the present invention.

FIG. 5 is a cross-sectional view illustrating a coupled structure between a housing and a base according to another exemplary embodiment of the present invention. The VCM illustrated in FIG. 5 is substantially same as the VCM illustrated in FIGS. 1 to 4, except for a coupling structure between the first foreign object penetration prevention unit of the base and the first foreign object penetration prevention unit of the housing. Thus, no redundant explanation to the same configuration will be provided, and like reference numerals will be provided to like configurations.

Referring to FIGS. 1 and 5, a distal end of the lateral surface (322) of the housing (320) of the VCM (800) is formed with a first jaw (326) preventing penetration of foreign object through the opening (105) of the base (100), and an upper end of the first foreign object penetration prevention unit (130) of the base (100) is formed with a second jaw (140) preventing penetration of foreign object through the opening (105) of the base (100).

In an exemplary embodiment of the present invention, the first jaw (326) formed at the distal end of the lateral surface (322) of the housing (320) and the second jaw formed at the upper end of the first foreign object penetration prevention unit (130) of the base (100) may be coupled by way of a half-lap joint method, for example.

In order to couple the first and second jaws (326, 140) by way of half-lap joint method, the first foreign object penetration prevention unit (130) of the base (100) and the lateral surface (322) of the housing (320) may be formed with a same thickness. Furthermore, an external surface of the lateral surface (322) at the housing (320) formed with the first jaw (326) meshed by half-lap joint method to an external surface of the first foreign object penetration prevention unit (130) of the base (100) formed with the second jaw (140) may be arranged on a same planar surface.

Meanwhile, referring to FIG. 5, the first elastic member (401) of the elastic member (400) is interposed between the first jaw (326) formed at the lateral surface (322) of the housing (320) and the second jaw (140) formed at the distal end of the first foreign object penetration prevention unit (130) of the base (100), where the first elastic member (401) may be fixed by the first and second jaws (326, 140).

Figure 6:
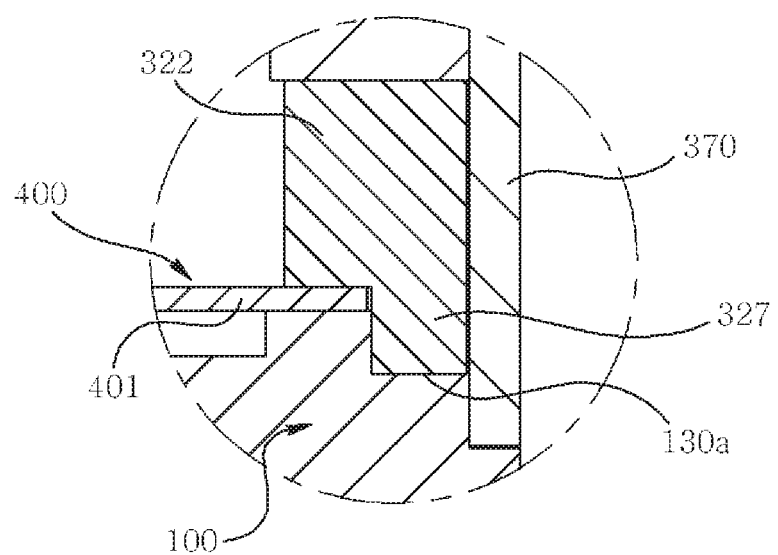
FIG. 6 is a cross-sectional view illustrating a housing of a voice coil motor and a part of a base according to still another exemplary embodiment of the present invention.

FIG. 6 is a cross-sectional view illustrating a housing of a voice coil motor and a part of a base according to still another exemplary embodiment of the present invention.

The VCM illustrated in FIG. 6 is substantially same as the VCM illustrated in FIGS. 1 to 4, except for a coupling structure between the first foreign object penetration prevention unit of the base and the second foreign object penetration prevention unit of the housing. Thus, no redundant explanation to the same configuration will be provided, and like reference numerals will be provided to like configurations.

Referring to FIGS. 1 and 6, a bottom surface of the lateral surface (322) of the housing (320) of the VCM (800) may be formed with a lug unit (327) protruded in a wall shape along the bottom surface, and the upper surface (110) of the base (100) may be formed with a coupling groove (130a) for inserting the lug unit (327). The foreign object can be prevented from entering the IR filter arranged at the opening (105) of the base (100) by the coupling groove (130a) formed at the upper surface (110) of the base (100) and the lug unit (327) formed at the bottom surface of the lateral surface (322) of the housing (320).

As illustrated and explained through FIGS. 1 to 6, although the prevention of foreign object from penetrating between the housing (320) and the base (100) through the meshed coupling between the housing (320) and the base (100) is illustrated and explained in FIGS. 1 to 6, a foreign object collecting member having a viscosity may be formed at an area where the housing (320) and the base (100) are meshed, to prevent a fine foreign object from introducing through a gap between the meshed housing (320) and the base (100). The foreign object collecting member may include an epoxy resin having a viscosity, for example. The foreign object collecting member may be formed between the lateral plate (370) of the yoke and the lateral surface of the base (100) coupled to the lateral plate (370).

Although FIGS. 1 to 6 have illustrated and explained the prevention of foreign object from entering between the housing (320) and the base (100) by the meshed coupling between the housing (320) and the base (100), an adhesive may be formed at an area where the housing (320) and the base (100) are meshed, to prevent the fine foreign object from introducing into a gap formed between the meshed housing (320) and the base (100).

INDUSTRIAL APPLICABILITY

As apparent from the foregoing, the present invention has an industrial applicability in that a first foreign object penetration prevention unit is formed at a base, and a second foreign object penetration prevention unit coupled to the first foreign object penetration unit of the base is formed at a distal end of a housing mounted with a magnet, to prevent a foreign object from introducing into an opening of the base by passing through the base and the housing, whereby a quality deterioration of an image or of a video generated from an image sensor module can be prevented.

While the present invention has been particularly shown and described with reference to exemplary embodiments thereof, the general inventive concept is not limited to the above-described embodiments. It will be understood by those of ordinary skill in the art that various changes and variations in form and details may be made therein without departing from the spirit and scope of the present invention as defined by the following claims.

What is claimed is:

1. A VCM (Voice Coil Motor) comprising:
   a bobbin;
   a coil block disposed on the bobbin;
   a base comprising an opening and a first prevention unit protruded at an upper edge of the base;
   a plurality of magnets disposed opposite to the coil block;
   a housing comprising a second prevention unit formed at a bottom surface thereof and connected to the first prevention unit;
   a yoke comprising an upper plate and a lateral plate extended from an edge of the upper plate; and
   an elastic member comprising a first elastic member coupled to a lower portion of the bobbin and a second elastic member coupled to an upper portion of the bobbin,
   wherein the first prevention unit is protruded in a shape of a rib and the second prevention unit is formed in a shape of a concave groove coupled to the rib of the first prevention unit.

2. The VCM of claim 1, further comprising a prevention member interposed between the first prevention unit and the second prevention unit.

3. The VCM of claim 2, wherein the prevention member comprises an epoxy resin having a viscosity.

4. The VCM of claim 1, further comprising an adhesive interposed between the first prevention unit and the second prevention unit.

5. The VCM of claim 1, further comprising a cover member coupled to the housing and formed with an opening for exposing a lens.

6. The VCM of claim 1, wherein the first elastic member is formed by a pair of subunits and the two subunits are spaced apart at a predetermined distance.

7. The VCM of claim 1, wherein a thickness of the housing is greater than that of the first prevention unit, and a part of the first elastic member is interposed between an upper surface of the base and the bottom surface of the housing.

8. The VCM of claim 1, wherein the yoke is formed with an opening for exposing a lens, and wherein the lateral plate of the yoke covers the housing and a portion of the base.

9. The VCM of claim 8, wherein the lateral plate of the yoke covers a border between the first prevention unit and the second prevention unit.

10. A camera module, comprising the VCM of claim 1; and
a lens coupled to the bobbin;
wherein the VCM adjusts a distance between the image sensor and the lens.

11. A VCM (Voice Coil Motor) comprising:
a bobbin;
a coil block disposed on the bobbin;
a plurality of magnets disposed opposite to the coil block;
a housing formed with a first jaw inhibiting penetration of a foreign object;
a yoke comprising an upper plate and a lateral plate extended from an edge of the upper plate;
an elastic member comprising a first elastic member coupled to a lower portion of the bobbin and a second elastic member coupled to an upper portion of the bobbin;
a base comprising an opening and a second jaw meshed with the first jaw of the housing; and
a prevention member interposed between the first jaw and the second jaw,
wherein the second jaw is protruded in a shape of a rib and the first jaw is formed in a shape of a concave groove coupled to the rib of the second jaw.

12. The VCM of claim 11, wherein the first jaw is formed at a lower surface of the housing and the second jaw is formed at an upper surface of the base.

13. The VCM of claim 11, wherein an outer surface of a lateral surface of the housing and an outer surface of a lateral surface of the base are arranged on a same planar surface.

14. The VCM of claim 11, wherein in an optical axis direction a length of the first jaw of the housing is same as a length of the second jaw of the base.

15. The VCM of claim 11, wherein a part of the elastic member is fixed between the first and second jaws.

16. The VCM of claim 11, wherein the yoke is formed with an opening for exposing a lens, and the lateral plate of the yoke covers the housing and a portion of the base.

17. The VCM of claim 11, further comprising a cover member coupled to the housing and formed with an opening for exposing a lens.

18. The VCM of claim 11, wherein the first elastic member is formed by a pair of subunits and the two subunits are spaced apart at a predetermined distance.

* * * * *